United States Patent [19]
Kolbe

[11] 3,726,542
[45] Apr. 10, 1973

[54] VEHICLE BANKING ARM CONSTRUCTION

[76] Inventor: Joachim Kolbe, 5126 Haskell Avenue, Encino, Calif. 91316

[22] Filed: Oct. 1, 1971

[21] Appl. No.: 185,765

[52] U.S. Cl. ..........................280/112 A, 280/96.2 R
[51] Int. Cl. ...............................................B60g 11/60
[58] Field of Search ....................280/96.2 R, 112 R, 280/112 A, 124 B

[56] References Cited

UNITED STATES PATENTS

| | | | |
|---|---|---|---|
| 3,241,854 | 3/1966 | Hamilton | 280/96.2 R X |
| 3,290,055 | 12/1966 | Kolbe | 280/112 R |
| 3,383,118 | 5/1968 | Kolbe | 280/112 R |
| 3,556,553 | 1/1971 | Kolbe | 280/112 A |

*Primary Examiner*—Leo Friaglia
*Assistant Examiner*—Leslie J. Paperner
*Attorney*—Elwin A. Andrus

[57] ABSTRACT

A curvebank car banking arm comprising a torsionally operated leaf spring bundle which is anchored at each end by a universally movable pivot and by a selectively spaced multiturn cushion to the vehicle superstructure and to a rigid axle respectively, front steerable wheels carried by the axle which receives its share of the pivot transmitted superstructure load at a point spaced substantially further away from the center of the vehicle axle than the respective leaf spring bundle end. The apparatus is designed to secure through increased torsional spring bundle windup and through added multiturn cushion resilient shear loading improved wheel rate as well as increased clearance for the angularly steered front wheel position while the vehicle negotiates a turn; the improvement disclosing new relationships which in combination make the reintroduction of rigid front axles to family passenger cars desirable by solving related rigid front axle problems previously unsolved.

4 Claims, 5 Drawing Figures

INVENTOR
JOACHIM KOLBE

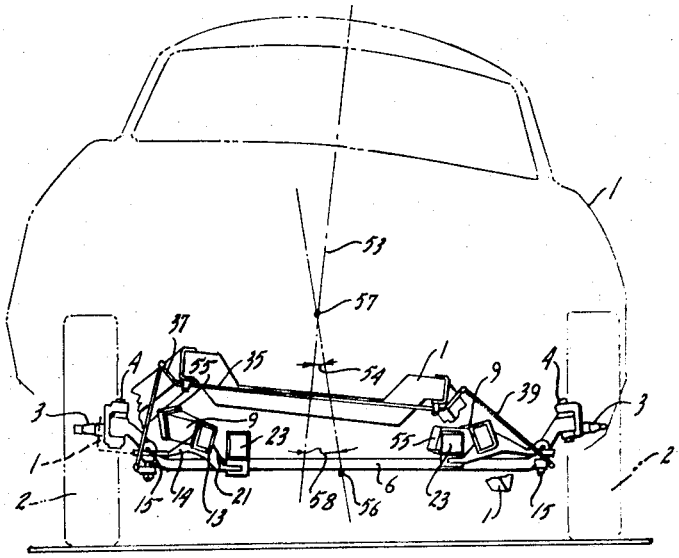

VEHICLE BANKING ARM CONSTRUCTION

BACKGROUND OF THE INVENTION

1. Field of the Invention

This invention pertains to the suspension structure for automotive vehicles, and in particular to an improved vehicle banking arm construction for resiliently supporting the super-structure of curvebank cars to secure inward leaning of the superstructure during curve ride of the vehicle. The subject matter of this invention constitutes a further addition to a number of contributing factors previously disclosed by this inventor, and which in combination results in a front end vehicle support that can safely and advantageously replace front wheel support of the so-called wheel-independently suspended kind with a banking arm supported rigid front axle.

2. Description of the Prior Art

The development of a practical inexpensive vehicle suspension linkage system causing the superstructure to lean inwardly during curve ride has been the subject matter of many U.S. and foreign patents issued to this inventor. These include the following:

| | | | |
|---|---|---|---|
| U.S. 2,072,521 | 3/2/37 | U.S. 2,576,686 | 11/27/51 |
| U.S. 2,076,786 | 4/13/37 | U.S. 2,739,823 | 3/27/56 |
| U.S. 2,116,027 | 5/3/38 | U.S. 2,820,646 | 1/21/58 |
| U.S. 2,234,676 | 3/11/41 | U.S. 3,181,883 | 5/4/65 |
| U.S. 2,262,289 | 11/11/44 | U.S. 3,556,553 | 1/19/71 |

Enumerating selected patent disclosures outlining the continuous progress of the development, a first concept was in effect a true pendulum car with its banking roll center located substantially higher than its mass center. An addition in lateral displacement of the mass center over and above that caused by the spring bed deflection during curve ride was needed to operate the mechanism. The spring arrangement incorporated into the system subtracted substantially from its effectiveness. U. S. Pat. No. 2,076,786, issued Apr. 13, 1937, and U. S. Pat. No. 2,116,027, issued May 3, 1938, describe and illustrate the structure.

A second vehicle built by this inventor with structure disclosed in U. S. Pat. No. 2,072,521, issued Mar. 2, 1937, and U. S. Pat. No. 2,234,676, issued Mar. 11, 1941, had banking mechanism incorporated comprising inclined compression links operating in a vertical plane and creating a banking roll center still located high above the mass center of the vehicle but relocating itself and, to a smaller extent, the mass center outwardly and downwardly during the banking roll of the superstructure. The banking mechanism was placed as a separate structure above the standard suspension linkage and was connected to the vehicle frame. The number of pivotal connections needed to operate the mechanism as a whole was thereby doubled. 32 pivotal connections were added to the 32 pivots of the vehicle before the change-over.

With softer resilient support and larger and softer tires, which came into use during that period, it became necessary to coordinate the vehicle front and rear suspensions to operate in unison. A number of U. S. patents were issued on the subject matter to this inventor. U.S. Pat. No. 2,262,289, issued Nov. 11, 1944, is referred to by way of example.

All banking structures referred to so far secured the desired banking turn by operating essentially in a vertical transverse plane. Thereafter, structures were invented and devised by this inventor which placed the linkage that operates the lateral mass shift and secures the banking turn, partly into a horizontal plane, and turned it about separately positioned inclined hinges. The arrangement operated in the space available for the linkage in height and below the vehicle frame and below the vehicle floor. A combination of functions with regard to the resilient means, oscillating means, and banking-guiding means of the superstructure made the arrangement possible, as described and illustrated in U.S. Pat. No. 2,576,686, issued Nov. 27, 1951.

With the exception of the first curvebank vehicle built by this inventor and referred to in the above enumeration, all others built and disclosed in their structural compositions in the related patents comprise a rigid rear axle and independently suspended front wheels, an arrangement 98 percent accepted as norm in at least the American passenger car market.

A further step in the curvebank car development is exemplified in the U.S. Pat. No. 2,739,823, issued Mar. 27, 1956, wherein the banking vehicle structure is disclosed with a device added to mechanically and hyraulically control and to virtually eliminate so-called curvebank shimmy, since with very soft springing introduced into the passenger car field a simple front to rear tie between the respective front and rear suspensions was not sufficient any more to control banking shimmy motions.

An intermediate combination of linkage was disclosed and a car was built, wherein the inclined banking hinges were replaced by inclined shackles, which were coordinated in their movement to selectively spaced ball joints and thereby secured the desired travel paths for the banking turn of the superstructure. The related U.S. Pat. No. is numbered 2,820,646 and issued Jan. 21, 1958.

In order to further reduce the height of the linkage structure and to secure improved damping characteristics and stability advantages, the banking shackles were replaced by rubber cushions as disclosed in Kolbe U.S. Pat. No. 3,181,833, issued May 4, 1965, and a seemingly final shape of a curvebank arm comprising a torsionally operated leaf spring bundle, two ball and socket joints, two rubber cushions and connecting support arms was established. Rubber, however, had certain undesirable characteristics and proved insufficient to secure the full potential of the structure. It was replaced by polyurethane as disclosed in the U.S. Pat. No. 3,556,553, issued Jan. 19, 1971, securing thereby additional beneficial ride characteristics.

While the most important feature of a curvebank car is the inwardly inclined position of its superstructure during curve ride, the maintaining of a support base for the superstructure, exceptionally resilient during straight ahead ride but firm during curve ride, resulting in even greater proper inclination, is most desirable.

The present invention discloses an improvement in geometry which not only results in a substantially firmed up base, but, in combination with other advantages typical for the related functioning of the elements comprising curvebank arms actually makes possible the reintroduction of rigid front axles into passenger cars again.

SUMMARY OF THE INVENTION

In carrying out the present invention the ball joint that connects the unsprung end of the torsion spring bundle of the front banking arm to the rigid axle is disposed outwardly toward the corresponding front wheel and further from the vertical longitudinal center plane of the vehicle than the spring bundle, and the multi-turn cushion is related to the straight line between the two banking arm ball joints supporting the opposite ends of the torsion spring bundle.

The invention takes advantage of the discovery that, by employing curvebank arms, it is not the location of the torsionally operated spring bundle, as it is in vehicles resiliently supported by semi-eliptic leaf spring bundles on a corresponding rigid axle, but the location of the related ball joints, which determines the difference in the amount of undesirable loss of wheel rate during curve ride, as related to the rate selected for the straight ahead ride of the vehicle.

The invention makes it possible to secure greater curvebank motion clearance for the front steered wheels relative to the superstructure.

The invention substantially avoids the difficulties which lead to the elimination of the rigid front axle for passenger cars and takes advantage of a reduction in overall length of the banking arm to provide a better ride with more effective banking control.

The accompanying drawings illustrate the best mode presently contemplated of carrying out the invention.

In the drawings:

FIG. 2 is a schematic front elevation of the front end of the vehicle having its superstructure mounted as shown in FIG. 1 and turned into a roll-banked position;

FIG. 4 is a detailed view of a left-hand front banking arm and related parts and elements of the superstructure to illustrate the dual wind-up operation of the torsion leaf spring bundle; and FIG. 5 is a perspective view of a left front banking arm similar to that illustrated in FIG. 1, with the geometric improvements of the invention shown schematically in overlay outline.

Figures 1, 3:
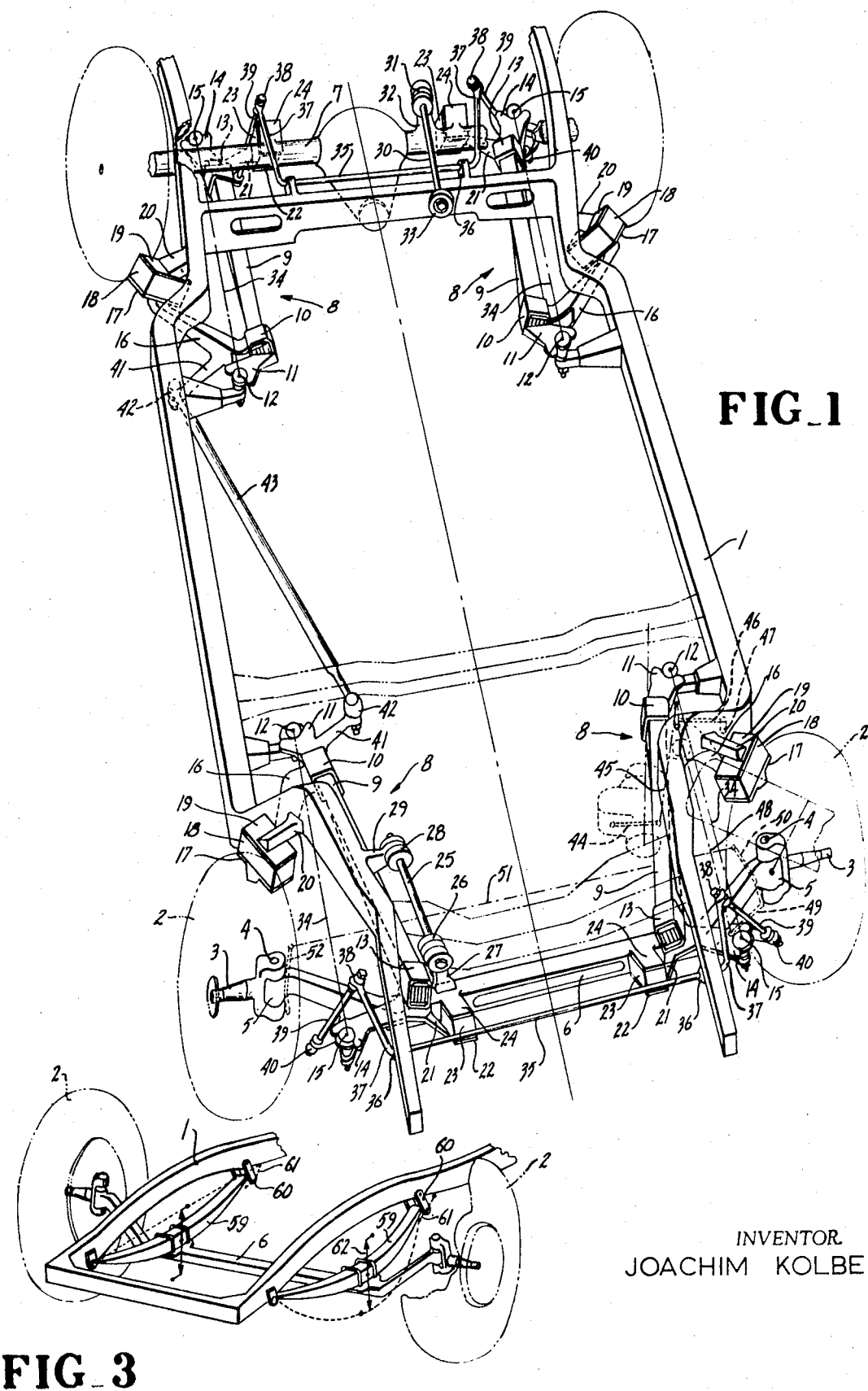
FIG. 1 is a perspective view of a vehicle chassis embodying the invention and showing the superstructure in a normal upright position.
FIG. 3 is a perspective view of a rigid axle as connected to the frame carried superstructure of a non-banking vehicle by a pair of semi-eliptic leaf springs, to permit visual comparison between this method of resilient superstructure support and its replacement by the banking arm system arranged in accordance with the improvements secured by this invention.

Before describing the illustrations referred to above, it should be pointed out that, while the replacement of the independent front wheel curvebank suspension with a wheel supported rigid axle and related curvebank arms is the core of this invention, many of the advantages of the new arrangement are enhanced by the influence, which the rest of the vehicle suspension geometry and structure have on the performance of the structurally new front end of the vehicle.

It is for this reason, that the vehicle as a whole is illustrated and described in FIGS. 1 and 2 in the following, before detailed supporting matter is illustrated and described in three additional figures.

FIG. 1 illustrates a vehicle body or superstructure having a chassis or body support frame 1 and supported by wheels 2 on the road. The wheels 2 are arranged in pairs, one pair at the front end and the other pair at the rear end of the vehicle. The wheels of each pair are disposed on opposite sides of the superstructure and are equally spaced from the longitudinal vertical center plane of the vehicle.

The front wheels 2 each are supported by a wheel spindle 3 hingedly connected by a kingpin 4 to the end 5 of the rigid front axle 6.

The rear wheels 2 are carrying the rigid rear axle housing 7. The front axle 6 and the rear axle housing 7 each are supporting the respective ends of a related pair of banking arms 8, which are supported at their other ends by the frame 1. Each banking arm 8 comprises a torsionally operated leaf spring bundle 9 held at one end by an enclosure anchor 10 carrying a support bracket 11 for the support of the ball and socket joint 12 which connects said end of the banking arm 8 to the frame 1. The other end of the respective leaf spring bundle 9 is held by the enclosure anchor 13 carrying the support bracket 14 for the support of the ball and socket joint 15 which connects said end of the banking arm 8 to the rigid axle 6 in the front and to the rigid axle housing 7 in the rear of the vehicle.

Each enclosure anchor 10 also carries a support arm 16 extending substantially horizontally and outwardly in a direction toward the nearest wheel 2 at a length of about one-half to one-third of the length of the related spring bundle 9 in accordance with the geometry pattern selected for the operation of the device. The support arm 16 carries a rectangular support plate 17 positioned inclined at an angle of approximately 45° relative to the road and to the longitudinal vertical center plane of the vehicle with its lower edge being closer to said center plane than its upper edge and with both edges arranged substantially parallel to the road. Each plate 17 supports a multi-turn cushion 18, fabricated as a substantially rectangular block of polyurethane based material and which rests against an upper carrying plate 19 which is connected by the bracket 20 to the frame 1.

Each enclosure anchor 13 also carries a support arm 21 which extends substantially sidewardly and carries a rectangular support plate 22 positioned inclined at an angle of about 32 degrees relative to the road and substantially parallel to the direction of the longitudinal vertical center plane of the vehicle and with its lower edge located closer to the respective rigid axle than its higher edge. Each plate 22 supports the multiturn cushion 23 shaped similar to cushion 18 resting against the carrier plate 24 carried in effect by the respective rigid axle or axle housing located nearest to it.

The rigid front axle 6 is additionally connected to the frame 1 by the torque arm 25 spaced vertically from the spring bundle 9 with its front end supported by the resilient bushing 26 to the vertically extending bracket 27 carried by the axle 6 and its rear end supported by the resilient bushing 28 to the horizontally extending bracket 29 to the frame 1.

The rigid axle housing 7 is additionally connected to the frame 1 by the torque arm 30 spaced vertically from the spring bundle 9 with its rearward end supported by the resilient bushing 31 to the vertically extending bracket 32 carried by the axle housing 7 and at its forward end supported by the resilient bushing 33 to the frame 1.

A straight line 34, representing each banking arm 8, is drawn between the centers of the corresponding ball joints 12 and 15.

Placing the pairs of curvebank arm ball joints 12 and 15 as close to the respective wheels as structurally possible necessitates in most cases the placing of the respective polyurethane multiturn cushions into the space ahead of or behind the wheels themselves. Such positioning by itself contributes to a broader based bed of resiliency and as such becomes a feature of the present invention.

Each frame end supports a sway bar 35 in bushings 36 with the longitudinally extending sway bar arms 37 connected by the resilient bushings 38 at their upper ends to the sway bar shackles 39 which are connected by the resilient bushings 40 to the respective axles closest to them.

Each enclosure anchor 10 located on one side of the vehicle also carries an arm 41 sidewardly extending in a direction opposite to each other in relation to the two end sections of the vehicle, whereby each of said arms carries a ball and socket joint 42 on its free end, supporting the ends of a front-to-rear tie rod 43 arranged to secure lateral operation in unison of the front and rear pair of banking arms 8 during the roll turn of the superstructure into a banked position.

FIG. 1 further illustrates, schematically only, the front wheel steering linkage which is not considered a part of this invention, but is planned to be presented in its inventive aspects in a separate application for patent. The linkage comprises the horizontally extending lever 44, which might be considered the Pitman arm of a steering gear mechanism enclosed by a gear housing mounted to the frame 1 to locate the arm as illustrated.

The lever 44 is pivotally connected at its outer end to a tie-rod 45 supported by the lever arm 46 which is pivotally supported by the pivot 47 to the frame 1. The lever arm 46 carries also the backward end of the steering drag link 48 whose forward end is connected to the spindle arm 49. The spindle member 3 also carries the steering arm 50. A steering cross tie-rod 51 extends between the steering arm 50 and a corresponding steering arm 52 located at the other side of the vehicle.

All tie-rod and drag link ends are connected to their respective support arms by ball and socket joints.

A horizontal cross section of the left front wheel 2 of the vehicle shown in FIG. 1 is drawn in dash-dot outline in its fully steered position to illustrate how space between the ball joints 12 and 15 and the torsional leaf spring bundle 9 is provided, while maximum wind-up of the bundle is secured with the positioning of the ball joint 15 away from the front end of spindle 3 in accordance with this invention.

In the following description the term "diagonalaxle position" is herewith defined as the position, where the wheel on one side of the axle moves upwardly while the wheel on the other side moves downwardly relative to the superstructure such as occurs during curve ride.

FIG. 2 outlines the vehicle shown in FIG. 1, in front elevation with its superstructure 1 moved into a curvebank position, as when under the influence of centrifugal force. The wheels 2 supporting the wheel spindles 3 which are arranged to turn about the kingpins 4 carried by the ends 5 of the rigid front axle 6 stay erect during the rotational curvebank motion of the superstructure. The forward ends of the front torsionally operated leaf spring bundles 9 are supported through the arms 14 by the ball joints 15 carried by the rigid front axle 6, and are also supported through the arms 21 by the multiturn cushions 23 which rest against the axle 6.

The front sway bar 35 is hingedly connected to the frame 1 and is with its outer arms 37 pivotally attached to the sway bar shackles 39, which are pivotally connected to the axle 6.

Due to the rotational banking motion of the superstructure and its frame 1 marked by the center line 53 and the angle 54, the backward ends of the front torsionally operated leaf spring bundles 9, carried by the frame 1 have shifted into the positions illustrated in dotted outline and marked 55. Since the front end of the superstructure is supported by the rigid front axle 6, the center of the rotational movement due to the displacement of the mass center 57 is located in height of the rigid axle 6 as indicated by point 56. The mass center 57 has shifted laterally relative to the primary roll center 56. Numeral 58 indicates the distance the superstructure center line 53 shifts, in height of the axle, from the center of the axle. It also indicates that wheel oscillation is free to operate without pushing the frame the superstructure out of position, as is not the case in the semi-eliptic spring arrangement. In non-curvebank cars, springs located on the curve outside would be compressed and yield, and springs located on the curve inside would have its static load reduced, resulting in an outward lean of the superstructure.

In the vehicle illustrated, the curvebank suspension creates an effective additional pivot located in height of the mass center 57 about which the superstructure 1 can relatively free roll clockwise, during a turn to the right as viewed by the driver, and will roll because during the lateral mass shift the accumulated pressure of the bundles on the curve outside and of the sway bar causes the shackle 39 located on the curve outside to erect itself and thereby releasing pressure and lifting that side of the superstructure, while the decreased bundle pressure and the reverse sway bar pressure of the sway bar causes the shackle 39 located on the curve inside to pull that side of the superstructure down. Due to the trapezoid arrangement of the shackles as appearing in front elevation the roll motion of the superstructure will be accelerated motion of sufficient angularity to secure a true inward inclination of the superstructure in spite of the normal yield of the curve outside located spring bundle and of the load reduction of the curve inside located spring bundle.

The increased height of the anchor 10 as graphically appearing on its curve outside elevation and the decrease in height on the curve inside result in shear deformations of the related cushions, which also take place and contribute substantially to the resistance against front end shimmy of the vehicle together with the shear deformation of the other six multiturn cushions 18, both in the front and rear banking arms 8 as shown in FIG. 1.

FIG. 3 is a perspective view of a vehicle front end suspension comprising the rigid axle 6 and the pair of longitudinally extending semi-eliptic leaf spring bundles 59, operated in bending and pivotally connected to the frame 1 at one end directly and at the other end by the shackles 60. FIG. 3 has been added to this disclosure in order to clearly illustrate and point out the progress achieved with the incorporation of torsionally operated curvebank arms instead of bending operated semi-eliptic leaf springs as a connecting means between a rigid front axle and the vehicle superstructure. During up and down movement of the axle, the lower end of the shackle 60 swings along the arc 61 backwardly and forwardly respectively. The center of the bending spring 59 moves only approximately one-half of the travel of that arc 61. However, where the wheel on one side moves up, the one on the other side moves down relative to the frame 1, the up moving wheel is pushed backwardly, and the down moving wheel is pulled forwardly twice as much as the center district of the respective spring 59 as graphically indicated in outlines 62. Since the torsion spring bundles 9 as illustrated in FIG. 1 have constant length and are generally free of bending, the disturbance and the loss of truly transverse position referred to above is avoided.

FIG. 4 illustrates and points out some of the other features resulting from the arrangement constituting the invention. The torsionally operated leaf spring bundle 9, one of the elements comprising the banking arm 8 is torsionally wound up in two ways. Whenever the rigid front axle takes a position inclined relative to the superstructure, the bundle 9 is wound up from the front, as indicated by the curved arrow 63, and the ball joint 15 as well as the cushion 23, both in effect carried by the axle 6 move with it into the inclined position. On the other hand, whenever the axle 6 moves up parallel to itself a number of inches, the bundle 9 takes an inclined position as appearing in side view. As pointed out above, the arm 16 with the support plate 17 constitute a rigid unit with the anchor 10 and as such would tend to also move into the inclined position essentially parallel to the bundle 9. However, since the plate 17 is firmly resting against the cushion 18 which is nearly rigid in compression and in turn rests firmly against the carrier plate 19 which is in effect part of the superstructure frame 1, the only way in which the front end of the leaf spring bundle is able to move upwardly is for the bundle to be torsionally wound up from its frame supported end, as indicated by the curved arrow 64.

In the illustration of FIG. 4, the cushion 18 is replaced by a human hand 65 operating a lever arm 66 which forms part of a socket wrench tube 67. An upward movement of the front axle carried ball joint of for instance, 4 inches, will move the lever 66 two inches up, but as indicated by the arrow 68, the hand 65 presses the end of the lever 66 down again winding the torsionally operated leaf spring bundle 9 up, but this time from the frame supported end.

This double wind-up of bundle 9 compensates partly for the loss in resilient resistance typical for bending semi-eliptic leaf springs spaced closely together for reasons of steered front wheel clearance requirements. Additionally, it is possible to secure further and even full maintenance of wheel rate in curve ride with the discovery that not the position of the bundles 9 but the position of the ball joints 12 and 15 determine the described banking travel path between superstructure and axles and also the force geometry of the lay-out and the amount of bundle windup, and that placing these ball joints further towards the outside of the superstructure than the bundles 9 is quite acceptable since the related fully steered wheel can swing between the ball joints without touching the bundle 9.

This latest feature is also important since it gives greater side swing freedom to the superstructure during the typical curvebank roll turn. The spring bundle 9 in this arrangement will go through a small swivel motion relative to the line 34 interconnecting the ball joints 12 and 15. The frame 1 can be kept sufficiently high in that zone so as not to interfere with the fully steered wheel.

DESCRIPTION OF THE PREFERRED EMBODIMENT

Reference is made again to FIG. 4 of the Kolbe U. S. Pat. No. 3,556,553 (polyurethane cushions), where the simultaneous operation to a varying degree, of all 8 multi-turn cushions incorporated into the vehicle is described and illustrated. Since front end curvebank arms resting on a rigid front axle offer approximately 140 percent more polyurethane deformation than a curvebank suspension comprising independently suspended front wheels, the control against shimmy by reason of the greater resistance increases proportionately in the arrangement of this invention.

The front to rear tie rod 43 illustrated in FIG. 1 transfers an additional shear motion induced polyurethane created wheel shimmy resistance to that of the front end and secures controlled wheel behavior in general with the oscillation of every single wheel.

Wheel oscillation in curvebank cars generally benefits from the built-in side resiliency between the wheel suspension structure and the superstructure, adding a dimension of freedom which improves the ride especially at high speeds by permitting the superstructure to hang in effect undisturbed and quietly above the hardworking suspension, even when driven over a rough road bed. The improvement according to this invention will add to the benefits of this vehicle behavior.

In FIG. 5 the characteristics of the functioning of the banking arms are extended to include the securing of the substantial increase in wheel rate during diagonal axle positioning for the vehicle in accordance with the main object of this invention. The system functions in such a way that the front axle supported banking arm ball joint 15 travels during the up or down move of the related front wheel along the resultant travel line of two arcs 69 and 70 with their respective axes of rotation constituting for arc 69 the line 71 extending through the center of the ball joint 12 and through the center of the multi-turn cushion 18, and for arc 70 in effect the center axis 72 extending longitudinally and horizontally through the line 73 which extends transversely between the ball joints 15 located on either side of the vehicle. The resultant travel line for ball joint 15 will be very close to the arc 70, with compensation for the distance between the arcs absorbed by the shear deformation of the related multiturn cushion 18.

As pointed out in the description of FIG. 4, the leaf spring bundle 9 is torsionally wound up from its rearward end whenever the axle 6 moves upwardly parallel to its static position, by keeping the arm 16 with its end plate 17 in substantially its horizontal position while the forward end of the bundle 9 and, to a diminishing degree all sections of the bundle also move upwardly.

The rearward end initiated torsional windup of both front suspension bundles 9 alone serves to force the superstructure 1 into its resiliently supported static height position. Only where the wheels 2 move into positions of unequal distance relative to the superstructure, as during wheel oscillations in response to road bed unevenness or during curve ride of the vehicle, will a torsional windup change initiated from the forward end of the bundle take place for both bundles in addition to the part windup from the rear due to the reduced upward move of the respective ball joint 15 as compared to that of related wheel 2.

Under this latter bundle windup condition, a loss in vehicle stability due to the reduction in wheel rate would occur if the ball joints 15 were placed at the end of the spring bundle as shown with the assumed ball joint position marked 74 and as specified in the later patent disclosures of this inventor cited above. In a rigid front axle supported semi-eliptic leaf spring carried vehicle superstructure such reduction is unavoidable, because the semi-eliptic leaf springs have to be placed sufficiently closely together to permit the front wheels to take their fully steered positions, as described for FIG. 1.

Since a rigid front axle, supporting steerable wheels, has to be kept in a truly transverse position at all times relative to the longitudinally extending superstructure it is essential to have the forwardly and backwardly located ball joints 15 and 12 each positioned and equal lateral distance from the vertical longitudinal center plane of the superstructure with the connecting lines 34 between the ball joints on each side of the vehicle extending parallel to each other, and with very small deviations permissible only to compensate for the slightly varying lateral curved travel paths of the front ball joints in their horizontal and vertical components.

However, the pairs of ball joints can be spaced considerably farther apart from each other than the spring bundles whose positions are determined by the needed wheel steering clearance and other practical clearance considerations. The nearer the forwardly located ball joints 15 are placed to the wheels, the closer the torsional degree of windup of the spring during movement of the axle into an inclined position, as initiated from the rear by means of the multi-turn cushion 18, will be to that amount of torsional windup which also is initiated from the rear whenever the axle rises parallel to itself, thereby adding to the resistance which is secured by a front initiated windup which will always be the result of an inclination between axle and superstructure in response to increased single wheel upward movement.

The diagram of this FIG. 5 illustrates the increased angularity obtained for the torsion spring bundle 9 windup from its rear end. By projecting the arc 75, constituting the travel path for the ball 74, outwardly into the arcs 70 and 69, defining only the center section of these two arcs, and comparing the full length of arc 69 with its center section, the increase in potential windup of the bundle 9 with placing the ball joint 15 into the outward position in accordance with this invention becomes evident. When related to the axis of rotation line 71 the length of arc 69 creates a greater angle than the projection of arc 75 into arc 69, when also related to line 71. The larger angle, outlined by the full length arc 69 is illustrated as reduced in surface size, but not in angularity, with shifting it backwardly, enumerated as area sector 76 into the position of multi-turn cushion 18, where the windup force becomes effective. Shifting the axle supported banking arm ball joint from a position at the end of the spring bundle 9 outwardly into a position nearer to the wheel or wheel spindle 3 will increase the desired bundle windup by approximately 40 percent while maintaining the geometrically important angle formed by the lines 34 and 71.

A comparison of the travel arcs 70 and 69 and the described projection of arc 75 into them also illustrates the increased influence on the shear operation of the cushion 18 during angular axle positioning where the ball joint 15 is moved from position 74 outwardly and nearer to the wheels. The increase in shear has nearly tripled making a substantial contribution to the strengthening of the effective wheel rate developed in accordance with this invention.

In evaluating the described relationships regarding the influence of the multi-turn cushion shear deflection it should be kept in mind that as disclosed in some of the previously cited patents of this inventor, the torsion spring bundles 9 will deflect under pressure exerted by the centrifugal force during curve ride and will maintain their added deflection loading on the curved outside and subtracted deflection loading on the curve inside even after the superstructure has rolled into its fully banked position.

The curve outside located cushions however will add shear deflection and stiffen that side while the curve inside cushions will subtract shear deflection and weaken that side of the vehicle support, with both sides contributing to a desired increased inclination of the superstructure. All axle supported cushions also contribute to stability by compensating for the respective small bundle loss in windup caused by the roll motion of the superstructure.

The new arrangement of the structural elements comprising the banking arms can be designed to result in maintaining 100 percent of the selected static height wheel rate with inclusion of the multi-turn cushion shear effect, where the use of semi-eliptic leaf springs will result during an axle position diagonal relative to the superstructure up to the position stops in maintaining only 25 percent of the static-height-vehicle-position securing the wheel rate.

Most of the above cited rules of geometry and general consideration are also applicable to banking arms designed to support the superstructure on the rigid rear axle housing.

The improvement thus described is based on the discovery that the line 34 connecting the two banking arm ball joints, and not the leaf spring bundle, is the geometric axis to which the positioning of the multi-turn cushions has to be related.

Various modes of carrying out the invention are contemplated as being within the scope of the following claims particularly pointing out and distinctly claiming the subject matter which is regarded as the invention.

I claim:

1. In a vehicle of the class described having a superstructure, a banking support for the superstructure connecting the superstructure on its forward end to a wheel spindle carrying wheel supported rigid front axle and on its rearward end to a rigid wheel supported rear axle, said banking support comprising a plurality of pairs of cooperating roll banking arms, each arm including a longitudinally extending spring bundle operated in torsion and connected by an enclosure anchor and a ball and socket joint at one end to the superstructure and at the other end to the respective rigid axle, a side lever arm protruding from the respective anchor and bearing at its end against a resilient multi-turn cushion of polyurethane-based material placed near the end of the spring bundle where axle supported and a side lever arm protruding from the respective anchor and bearing at its end against a resilient multi-turn cushion of polyurethane-based material placed intermediate the length of the spring bundle where superstructure supported, each rigid axle controlled in its vertical position by at least one longitudinally extending torque rod, vertically spaced from the spring bundle and pivotally connected to said axle and to the superstructure, at least one transversely extending sway bar carried by the superstructure and operated by a pair of inclined sway bar shackles connecting longitudinally extending arms of said sway bar to the related rigid axle, a tie rod operably extending longitudinally between one roll banking arm in the front of the vehicle and one rear roll banking arm to secure track holding of the pair of front and rear wheels, wherein the improvement comprises a placing of the ball joint carried by the rigid front axle in support of the forward end of the respective banking arms at a substantially larger distance away from the vertical longitudinal center plane of the vehicle than the forward end of the related spring bundle, to secure both improved wheel rate maintenance during diagonal position of the axle relative to the superstructure, such as during vehicle curve ride, and freedom of interference between leaf spring bundle and front wheel in its maximum steered position, and whereby maintenance of wheel rate in combination with previously disclosed banking arm characteristics makes possible the reintroduction of rigid front axles to softly sprung family passenger cars.

2. In a vehicle of claim 1 in which the ball and socket joint supporting, in combination with the related multiturn cushions, the forward end of the torsionally operated leaf spring bundle, is positioned nearer to the related wheel than is the bundle, in order to secure an angular spring bundle windup during diagonal axle position to a degree close to the windup secured during axle upward movement parallel to its static position.

3. In a vehicle suspension comprising roll banking arms as set forth in claim 1 wherein the diagonal position of the related axle causes the axle supported banking arm ball joint during its upward or downward travel to operate the related frame supported multi-turn cushion to deflect in shear, thereby exerting travel resisting forces which add substantially to the forces active during the torsional deflection of the related leaf spring bundle, and increasing the rate resistance of the related wheel to secure a resistance substantially equal to the rate resistance caused by parallel axle movement.

4. In a vehicle of claim 1, wherein the placing of the related ball joints, spring bundles, and multiturn cushions, selected for the front axle supported banking arms is also applied for the rear axle.

* * * * *